Patented Nov. 27, 1951

2,576,312

UNITED STATES PATENT OFFICE 2,576,312

METHOD OF MAKING MINERAL WOOL

Leonard John Minnick, Cheltenham, Pa., assignor to Baldwin-Hill Company, Trenton, N. J., a corporation of New Jersey No Drawing. Application August 16, 1948, Serial No. 44,580

7 Claims. (Cl. 106—50)

The present invention relates to a process for the manufacture of mineral wool, and more particularly it relates to a process for the preparation of mineral wool from novel raw material providing an improved process and mineral wool product.

*The manufacture of mineral wool and problems encountered therein*

Mineral wool is a well-known item of commerce, used principally as an insulating material, which is produced by fiberizing molten inorganic material. Chemically, mineral wool generally analyzes as follows: $SiO_2$, 30–50%; $Al_2O_3$, trace–20%; iron oxide (ferrous and ferric), trace–35%; CaO, 10–45%; and MgO, trace–25%; with the possibility of minor amounts of titanium, manganese, sulphur, sodium oxide, potassium oxide, and the like also being present. Thus, the charge material which is ordinarily used for producing the molten mass is varied in nature and may consist of glass, slag, various rocks, and the like. Normally, however, the chemical analysis of the major constituents is not suited for the formation of mineral wool, without modification. Fluxes are added to the charge to assure the proper properties, particularly the viscosity of the molten mass, and the surface tension of the molten filaments. These fluxes may be either acidic or basic in character. In some instances silica is added, and in other cases additions of stone or slag providing calcium oxide are necessary. The relative percentage of silica, alumina, iron oxide, calcium oxide, and magnesium oxide is the principal factor which determines the character or quality of the mineral wool produced.

Generally, as can be seen, the major constituent of rock wool is silica; therefore, raw materials high in silica are necessary. Coarse silica-containing raw materials, which may be used in the preparation of rock wool, however, are relatively expensive. Cheaper silica-containing raw materials, on the other hand, are generally too fine, and often contain relatively large quantities of alumina, and the presence of appreciable alumina in the raw material charge seriously interferes with the production of molten slag suitable for fiberizing, particularly because it impairs the viscosity of the molten mass. Therefore, since it is desirable that the proportion of alumina in the charge be kept at a minimum, the use of cheaper silica-containing raw materials is limited. In addition, the presence of iron, and especially ferrous iron, in the charge is extremely desirable. In the first place, ferrous iron acts as a flux during the melting operation, and secondly the presence of significant amounts of iron provides a so-called "black wool" which possesses many improved properties. Iron-containing raw materials are likewise often relatively expensive.

The choice of materials for the production of the molten mass in the cupola is also determined by their physical properties as well as their chemical characteristics. The size and shape of the separate ingredients as well as their individual fusion points must generally be taken into consideration. The charge, as a whole, must be sufficiently porous so that the blast of hot gases can carry the necessary heat to each piece of charge. Furthermore, none of the individual ingredients should be so high in fusion temperature, nor so slow in fusion rate due to large size, that they fail to blend with the faster fusing ingredients to give a homogeneous fused mass. For instance, sizable pieces of slow-fusing ingredients, such as large pieces of silica rock, are unusable because of their failure to fuse down completely in time to blend with all the other ingredients present. Overly coarse materials may, however, be reduced somewhat by crushing, but finely divided ones, such as sands, fine slags, various dusts and the like, are not easily usable due to their plugging effect. Moreover, certain mineral wool waste materials such as waste wool and shot, the incompletely fiberized droplets which solidify in the shape of small, round pellets, would constitute very valuable charge ingredients since they already conform to the proper chemical balance required in the charge. Such materials, however, cannot be used as such due to their extreme fineness, and the cost of agglomerating them into coarse bodies in accordance with the present procedures has seriously restricted their use.

Thus, while from many points of view, and particularly from the point of view of rapid melting and uniform blending, chemically suited raw materials comprising finely sized and intimately mixed constituents in the form of agglomerated bodies, for instance, briquets, possess many advantages, raw materials in agglomerated form have not been commercially employed heretofore in the preparation of mineral wool for many reasons. One of the most important reasons is to be found in the nature of the various usual binding materials needed to bind the individual aggregate particles of raw material into a coherent mass. Organic binders are generally too expensive for commercial use and the various common inorganic binders such as sodium silicate and plastic clays possess chemical and physical characteristics which render their use impractical. Sodium silicate, for instance, acts as a strong, uncontrollable flux in the cupola, while clays generally contain a large proportion of alumina.

Objects of the invention

It is an object of the present invention to provide an inexpensive improved process for the manufacture of a superior grade of mineral wool wherein the above-mentioned problems are overcome.

Another object is to provide a process for the manufacture of mineral wool in which the raw material comprises a cheap and abundant native material which contains a relatively large amount of silica and iron and a comparatively small amount of alumina and is thus ideally suited chemically as a charge material for the cupola.

Still another object is to provide an improved process for the manufacture of mineral wool in which one of the raw materials charged to the cupola is readily available native material which acts as a mild and controllable flux in the melt.

Still another object is to provide an improved process for the manufacture of mineral wool in which one of the raw materials charged to the cupola is cheap and abundant and yet provides a wool product of superior properties.

A further object is to provide an improved process for the manufacture of mineral wool in which finely divided, and intimately blended ingredients are charged to the cupola in the form of coarse agglomerates, bound together by a native material which is itself an excellent raw material as hereinabove discussed.

A specific object is to provide an improved process for the manufacture of mineral wool in which finely divided mineral wool waste materials, ideally suited chemically for use as raw materials, are utilized as at least part of the charge ingredients, in conjunction with another cheap raw material serving to bind them together into a strong agglomerate.

Further objects, including the provision of an inexpensive mineral wool of a superior grade, will be apparent from a consideration of the following specification and the claims.

General statement of process of the invention

In accordance with the present invention, there is added to the cupola in the manufacture of mineral wool, a charge comprising glauconite. The charge is then melted and the molten mass is fiberized in accordance with conventional mineral wool-manufacturing procedures. The chemical composition of the charge of mineral wool-forming ingredients, including the glauconite, will lie within the chemical analysis hereinafter set forth. As will be more fully discussed hereinafter, the glauconite is preferably utilized in the form of agglomerated bodies advantageously containing other finely divided aggregate minerals chemically suited for the manufacture of mineral wool.

General description of glauconite

The utilization of glauconite as part of the charge in the preparation of mineral wool offers many unexpected advantages. In the first place, glauconite is a cheap and abundant material which can be used as mined. Glauconite is found as a sand-like, granular amorphous hydrous silicate of iron and potassium containing small but varying amounts of alumina, magnesia, and lime and minor amounts of other materials. One of its most abundant sources is the greensand beds of New Jersey from which it can be cheaply shipped to the eastern industrial areas. Chemically, glauconite generally contains: $SiO_2$, 49–52%; $FeO$, 2–6%; $Fe_2O_3$, 16–22%; $Al_2O_3$, 3–9%; $CaO$, trace–7%; $MgO$, trace–4%; $K_2O$, 3–8%; $Na_2O$, 0–2%; $P_2O_5$, 0–3%; combined $H_2O$, 5–10%; a typical analysis of New Jersey greensand being as follows: $SiO_2$, 49–65%; $FeO$, 2–94%; $Fe_2O_3$, 18.58%; $Al_2O_3$, 3.62%; $CaO$, 6.54%; $MgO$, 2.93%; $K_2O$, 3.87%; $P_2O_5$, 1.84%; combined $H_2O$, 9.08%; the balance being minor impurities.

Advantages of process of the invention

It can thus be seen that a major constituent of glauconite is silica which makes it a valuable source of silica in the preparation of mineral wool. Equally as important, however, is the fact that aside from its high silica content it contains relatively large amounts of iron and at the same time relatively small quantities of alumina. Thus, glauconite can be utilized to replace a large part of the more expensive mineral wool-forming materials heretofore employed. Moreover, much of the iron in glauconite exists in the ferrous state, which means that it is available as a fluxing ingredient in the charge. Since the fluxing power of the glauconite depends upon the proportion of ferrous iron therein, it can be controlled by regulating the amount of oxidation or reduction of iron that occurs during the melting of the charge. In addition, the type of the wool fibre is directly related to the melt viscosity which is in turn directly related to the proportion of ferrous iron, and, therefore, it can be seen that glauconite affords an inexpensive material with which to obtain relatively accurate control of the fibre characteristics. The presence of the iron, both ferrous and ferric, in glauconite, moreover, also provides a so-called "black wool" having superior chemical and physical properties. For example, black wool has greater resistance to high temperatures than does the ordinary light-colored mineral wool, and possesses greater resistance to water and is more chemically stable.

Moreover, as will be more fully discussed hereinafter, glauconite possesses unusual binding properties for normally non-adhesive aggregate particles. This feature thus makes glauconite exceedingly valuable in that it may serve as a binder in agglomerated bodies prepared from finely divided mineral wool-forming charge ingredients. Such agglomerates, as indicated contain mineral wool-forming charge ingredients, including the glauconite, in intimately mixed and finely divided form yet agglomerated into a mass adapted for use in a cupola. Mineral wool-forming charges in such a form represent the optimum method of insuring proper melting conditions in the cupola. In addition, since glauconite itself is a fine silica-containing material and since other fine silica-containing material may be incorporated in the agglomerated body, one of the principal difficulties in the manufacture of mineral wool by present procedures is overcome. Heretofore, relatively coarse pieces of silica-containing material were charged to the cupola, and often these pieces did not melt down completely but instead built-up on the bottom of the cupola. In a relatively short time, this deposit became so thick that operation had to be discontinued while the bottom was removed and a new bottom installed. This, obviously, was an undesirable expenditure of time and money. By charging silica in fine form admixed with fluxing materials in the form of agglomerates, all the silica is readily melted and no undesirable bottoms deposit is encountered. Moreover, because of the binding properties of glauconite, waste products encountered in the mineral wool industry such as shot and waste wool are readily reused by uniting them together into agglomerated bodies.

*Ingredients of mineral wool-forming charge*

Specific constituents of a mineral wool-forming cupola charge, as indicated previously vary widely so long as the balance between the various basic chemical components such as silica, alumina, iron oxide, lime and magnesia lies within the ranges hereinabove set forth. Besides the glauconite, the mineral wool-forming ingredients employed in accordance with the present invention may include such silica-containing materials as silica sands, for example, bar sand, silica rock, sandstone, crushed glass, siliceous limestone, dolomites high in silica, and the like; the various slags such as coal ash slag, metallurgical slags for instance iron blast furnace slag, copper and lead furnace slag, and the like; lime-bearing materials such as those mentioned above, ordinary limestone, dolomite, calcium-bearing slags, and the like; iron-bearing materials such as the slags mentioned above, mill or roll scale, and the like. Advantageously, there is included in the charge waste materials encountered in the manufacture of mineral wool such as waste mineral wool and shot. The former is the scrap wool that is obtained throughout the manufacturing process from the time the fibres are formed through fabrication of the wool into bats or loading it into bags and the like; while the latter are small glass-like beads or pellets which are obtained when the droplets of molten charge material are not fully fiberized by the blowing operation. A solid fuel such as coal, coke and the like is often added to the cupola to furnish, upon combustion, the heat required to melt the mineral wool-forming materials, and if desired, fuel may be incorporated in the glauconite-bound agglomerate.

*Preparation of agglomerated bodies for use in process*

As stated, the glauconite will most generally be added to the cupola in the form of agglomerated bodies thereof, and preferably in the form of agglomerated bodies in which are included some or all of the other mineral wool-forming ingredients, and fuel if desired, in relatively fine particle size. Glauconite has been found to possess an unusual bonding affinity within itself and between itself and ordinarily non-cohesive particles such as, for example, crushed rocks, slags, shot, sand, coke, coal, and the like. Useful agglomerated bodies, such as extruded or molded shapes, for instance, brick-like bodies, briquets, and the like, consolidated lumps such as nodules, and the like, adapted for charging raw materials to the cupola, can be prepared utilizing this binding power of glauconite. Such agglomerated products are not claimed herein but are the subject matter of copending application of Charles Raymond Brown, Serial No. 44,594, filed August 16, 1948.

*a. Binding properties of glauconite*

As disclosed in that application, strong agglomerated bodies may be prepared in which individual aggregate particles of mineral wool-forming material sought to be agglomerated such as those mentioned above, and fuel if desired, are firmly bound in a matrix of glauconite. Glauconite exists in nature as relatively friable particles which when subjected to a rubbing, shearing or other disintegrating action release extremely fine particles which readily smear or coat adjacent surfaces. Thus when glauconite is subjected to such rubbing or shearing action in the presence of aggregate particles, the aggregate particles become smeared with this fine material. This coating of smeared glauconite possesses unusual natural cohesion with aggregate particles, and thus when the smeared aggregate particles are consolidated they cohere into a dense, hard agglomerated body. An examination of such agglomerated bodies shows that the body throughout possesses the characteristic greenish coloration of glauconite, indicating that extremely fine particles of glauconite are thoroughly dispersed therein, coating the individual aggregate particles and forming a continuous binding phase of unusually high natural cohesion. Although the exact reason for this unusual binding power of glauconite is not fully understood, said copending application sets forth certain characteristics of glauconite which, it is believed, contribute to the binding properties of that material.

As disclosed in said copending application, glauconite can be mechanically reduced to three distinct phases as determined by their rate of settling in water. One of these phases consists of quick settling, coarse-grained particles low in silica. Another consists of slower settling, finer particles possessing a higher silica content. The third phase, which is also high in silica content, consists of extremely fine colloidal particles of sub-micron particle size which when mixed with water forms a gel-like structure which settles at an extremely slow rate. The colloidal particles of this gel-like mass are hydrophilic and hold appreciable amounts of water as an immobile layer or lyosphere, enveloping the particle. The first two quickly settling phases may be considered as one, and is referred to herein as the "particulate phase" of the glauconite, while the extremely fine phase is referred to as the "colloidal phase" of the glauconite. It is believed that, when glauconite is subjected to a mechanical rubbing or shearing action as more fully discussed hereinafter, the colloidal and particulate phases are developed and any individual aggregate particles that are present become smeared or coated with these phases. Thus, it may be said that the colloidal phase and the particulate phase, in intimate admixture, form the continuous binding matrix in the product, and the combined colloidal and particulate phases will be referred to herein as the "binding phase" of the glauconite. The particulate phase of the glauconite exists in the agglomerated bodies employed in accordance with the preferred embodiment of the present invention as relatively small particles being no greater in size than about 100 microns, with an average particle size of from about 5 to about 25 microns. The colloidal phase, as indicated, is of extremely fine sub-micron particle size. Based on the total weight of the smearable glauconite binding phase, the colloidal phase is generally present in an amount between about 5% and about 25%, the remainder being present as the particulate phase. It will be understood that in the agglomerated bodies there may also be particles of glauconite having sizes larger than 100 microns, the exact proportion of which depends upon the extent the glauconite is mechanically reduced during the mixing or other operations. Any glauconite particles having a particle size greater than 100 microns that are present in the product are considered as aggregate particles and as part of the discontinuous or dispersed aggregate phase.

b. *Development of the glauconite's binding properties*

As disclosed in said copending application, the above-defined glauconite binding phase may be developed in a wide variety of ways. The friability, or ability to be reduced to the several phases, of the glauconite varies depending upon its source, the method employed in mining it, previous handling, whether it has been subjected to the action of water, and the like. In any event, a mechanical rubbing, shearing, or other disintegrating action may be resorted to, the intensity of which will depend upon the friability of the glauconite employed. For example, in some instances, the glauconite may be of such friability that the rubbing action encountered when it is intimately mixed with the aggregate particles to be agglomerated, is sufficient to provide the required amount of binding phase. On the other hand, other glauconite may require more intense rubbing or shearing action such as is obtained by the use of various crushing, grinding or pulverizing mills as more fully discussed hereafter. The intensity of the rubbing or shearing action also depends upon the proportion of glauconite it is desired to have present in the body as binding phase, and as a general proposition it may be stated that the more intense and/or the longer the disintegrating action, the greater the proportion of glauconite that is converted to the smearable binding phase.

c. *Proportions of glauconite binding phase in agglomerated bodies*

The amount of glauconite required for use as a binder in the agglomerated products employed in the preferred embodiment of the invention varies widely depending upon the proportion thereof existing as the smearable binding phase, and upon the particle size distribution of aggregate mineral wool-forming ingredients employed. In any case, the amount employed will be sufficient to coat aggregate particles in the mixture such that upon the application of slight pressure the mixture will cohere into a firm structure. To put it another way, the amount of glauconite employed will be sufficient to provide a continuous binding phase or matrix comprising the colloidal and particulate glauconite phases in the product. Generally, to provide satisfactory binding, the glauconite binding phase is present in an amount of at least about 3% by weight of the agglomerated body and preferably at least about 4%. The amount of binding phase present may be increased greatly above these figures, and the amount it may be increased will be determined by the chemical balance provided by the entire charge of mineral wool-forming ingredients.

d. *Incorporation of mineral wool-forming ingredients in agglomerated body*

The particular method of forming the agglomerate and the size and shape desired in the product may also be taken into consideration in determining the quantity of glauconite binding phase to be employed. For instance, where vacuum consolidation of the mixture is resorted to, less binding phase may be required than in other methods since consolidation brought about by vacuum greatly enhances the strength of the mass. In most cases, no more than about 50% of the agglomerated body will be the glauconite binding phase referred to, although as high as 60% to 70% of glauconite binding phase may be employed, if desired. As indicated, a portion of the glauconite present in the agglomerated body may exist as particles larger than 100 microns. The proportion of glauconite in the body that is present as the binding phase depends somewhat upon the glauconite content desired in the body. For example, where a large proportion of glauconite is desired, only a relatively small fraction thereof need be present as the binding phase so long as sufficient binding phase is present to serve as the continuous binding matrix. On the other hand, where a small proportion of glauconite is present in the body, a relatively large fraction thereof may be present as binding phase. Advantageously, at least 45% and preferably 60% to 100% of the glauconite present in the body will be present as the above defined binding phase.

It is preferred to incorporate other mineral wool-forming ingredients in fine particle size in the agglomerated body, in which case, the amounts of mineral wool-forming ingredients incorporated with the glauconite in the agglomerate will be selected to provide an overall chemical balance in the cupola charge within the ranges set forth previously. It has been found that this chemical balance is met when the overall charge of mineral wool-forming ingredients comprises no more than about 75% by weight of glauconite. Thus when the entire charge of mineral wool-forming ingredients is to be prepared in the form of glauconite-bound agglomerates, the proportions of mineral wool-forming ingredients including glauconite in such agglomerates will be such as to provide an analysis within the above range of proportions and the glauconite will be present within the proportions set forth, namely, between about 3% and about 75%, and preferably between about 8% and about 50%. On the other hand, it may be more desirable in certain cases to agglomerate only a portion of the more finely-divided mineral wool-forming ingredients and to add such agglomerated bodies along with coarse pieces of other mineral wool-forming ingredients to the cupola to make up the entire charge. Thus, a highly economical agglomerate adapted for addition to the cupola along with coarse pieces of mineral wool-forming raw materials such as coarse slag, limestone, and the like, comprises shot and/or waste wool. For instance, a valuable agglomerate comprises between about 15% and about 35% glauconite, between about 15% and about 25% silica sand, and between about 45% and about 65% shot.

e. *Procedure of preparing glauconite-bound agglomerated bodies*

In preparing the agglomerated bodies, the aggregate particles of mineral wool-forming material, and/or fuel, if desired, to be agglomerated are intimately mixed with the glauconite to disperse the aggregate particles thoroughly in the glauconite, to coat aggregate particles with the smearable glauconite binding phase, and to provide a uniform moldable mixture of the aggregate particles in a matrix of the glauconite binding phase above referred to. The term "moldable" is used to described the caking characteristics of the mixture if subjected to slight pressure as by squeezing with the hand. As indicated above, in some cases the required binding phase of the glauconite may be developed in the presence of the aggregate by merely mixing the ingredients together, for example, in a dough mixer or other mixing device. However, in most cases, it is advantageous to subject the glauconite to a more vigorous rubbing or shearing action between moving surfaces to develop the required binding phase, and, as stated, the longer the treatment and/or the more vigorous the treatment, the more complete will be the conversion of the glauconite to the binding phase. This may be accomplished in any machine where a rubbing or shearing action between moving surfaces is encountered such as in a pug mill, muller, rod mill, ball mill, Banbury mixer, and the like. While this operation may be performed on the glauconite separately prior to incorporating therewith mineral wool-forming aggregate, the development of the binding phase by rubbing or shearing forces is preferably conducted in the presence of the aggregate. When glauconite is separately treated to develop the binding phase, this may be accomplished by the use of pulverizing and disintegrating equipment such as micropulverizers, fluidizing mills, and the like, as well as those machines mentioned above.

A small amount of water is advantageously present with the various ingredients during mixing. This water forms the gel-like material with the colloidal phase of the glauconite increasing its cohesive properties. The presence of water also facilitates the blending of the ingredients, and increases the plasticity of the mass. The amount of water present is relatively low, but the exact amount will depend in part upon the method employed in forming the agglomerated body. For example, if the body is to be formed by extrusion, more water will be required than if the agglomerated body is to be formed by compaction in, for example, a briquet press or by consolidation in a nodulizing machine. The amount of water present will also depend upon the type of other materials in the mixture. In any event, the amount of water is sufficient to form a moldable or formable mass, such that the mixture will form a coherent mass under slight pressure such as by squeezing with the hand. In most cases, there is sufficient moisture already present in the glauconite to provide the desired moldable consistency, but in some operations water is incorporated with the ingredients during mixing. In most cases, the amount of water present in the mixture will be less than about 15% and more generally between about 5% and about 10%.

A particularly advantageous method of preparing a mixture that is readily compacted into hard, dense agglomerates, such as briquets, which are highly suitable for use in accordance with the preferred embodiment of the present invention, comprises mixing the glauconite and aggregate particles sought to be briqueted in a relatively dry condition, that is containing between about 5% and about 10% of moisture, in a muller or like machine. A minimum of about 9 horsepower hours is expended per ton of material during the mulling cycle. During the mulling, the visible character of the mass changes from a loose flowing mixture to a densified mass which cakes under pressure but does not stick to the hand. To the eye, it seems relatively dry, and to the touch somewhat grainy. This mass may then be compacted into tough, dense agglomerates, such as briquets of very high strength. Without further treatment, briquets made in this manner may be roughly handled and will withstand a drop of six feet upon a hard surface.

During mixing of the glauconite and aggregate particles to be agglomerated, the binding phase of the glauconite, if not already present due to a previous treatment, is developed, and becomes smeared over the surfaces of individual particles forming the continuous binding phase of glauconite particles. Although the binding phase of the glauconite is not sticky, the particulate phase of the glauconite possesses a strong natural cohesion with the colloidal phase and the latter phase exhibits a strong adhesion with the aggregate particles sought to be bound. These effects are very pronounced and are believed to be caused by electrostatic or energy forces which couple the smeared glauconite with the various aggregate particles. That the binding phase of the glauconite possesses a remarkable natural cohesion with aggregate particles can be readily demonstrated by mixing slag particles with glauconite so that the binding phase smears and coats the slag surfaces. Once the slag particles have thus coated, it is very difficult to wash the fine glauconite therefrom. These properties serve to unite the various ingredients into a coherent mass which when consolidated or compacted as described hereinafter, forms a firmly bound agglomerated structure.

The moldable mixture thus prepared may be formed into the agglomerated body by a wide variety of methods. For example, the mixture may be merely consolidated into lumps or nodules in a rotating agglomerating machine wherein the mixture is continuously tumbled until the mass is resolved into separate lumps of no definite configuration. However, it is preferred that the moldable mixture be formed into more dense and hard shapes by compacting under pressure. Formation under pressure by compacting or molding may take place in various types of machines. For example, the agglomerated bodies may be formed by extruding the mixture through a die by means of an extrusion auger, or in a dry press. Brick-like agglomerated bodies, for instance, may be conveniently prepared by the use of de-airing brick machines. On the other hand, the mixture may be formed into agglomerated bodies such as briquets, pellets, and the like by the use of pellet machines, briquetting presses or rolls, and the like. The mixing and/or forming operations may be conducted in a continuous or batchwise manner as desired.

*Procedure for making mineral wool*

As stated, in accordance with the present invention, a portion of the material charged to the cupola in the manufacture of mineral wool is glauconite. While the glauconite may be added to the cupola as such if the other mineral wool-forming ingredients are of sufficient size to provide the requisite porosity in spite of the fineness of the glauconite, it is desirable for the many reasons apparent above to charge the glauconite in the form of agglomerated bodies. Such bodies consisting entirely of glauconite may be fed to the cupola along with the other mineral wool-forming ingredients to provide the requisite chemical balance referred to previously. However, as has also been made apparent above, according to the preferred embodiment of the present invention, the glauconite is charged to the cupola in the form of agglomerated bodies containing one or more other mineral wool-forming ingredients in fine particle size in which glauconite serves as the binding material as outlined above. As stated, the amount of glauconite required in the agglomerated body from the standpoint of the binding phase may vary from as low as about 3% of binding phase to any proportion above that. Referring, however, to the overall amount of glauconite in the cupola charge of mineral wool-forming ingredients, it has been found, as indicated above, that proper chemical balance can be met when the glauconite is present in the charge in an amount not greater than about 75% based on the total weight of mineral wool-forming ingredients in the charge. Obviously, if a large amount of coarse pieces of mineral wool-forming ingredients, other than glauconite, is to be used, it is possible that the glauconite content of the entire charge of mineral wool-forming ingredients may be quite low, for example, 1% to 3%. However, in order to insure that the benefits resulting from the use of glauconite as a raw material will be clearly apparent, it is desirable to employ the glauconite in an amount of at least about 3% of the mineral wool-forming charge, and preferably between about 5% and about 50%. The remainder will comprise other mineral wool-forming materials of the type hereinabove mentioned, consideration being taken in their selection to the overall proportion of basic chemical components as outlined previously. Thus, agglomerated bodies, which contain a relatively low proportion of glauconite sufficient to bind the other mineral wool-forming materials therein, may be employed, and it will be understood that in such a case added glauconite may be provided, if desired, for example, either in the form of agglomerates consisting wholly of glauconite or containing relatively large amounts thereof in order to provide a desired overall glauconite content in the charge.

Following the charging of the ingredients to the cupola, the procedure for the manufacture of the mineral wool follows the convention procedure. The charge is melted by the application of heat usually by charging fuel such as coke directly to the cupola where it is burned. The temperature required to completely melt the ingredients depends somewhat upon the types of ingredients present and the proportions thereof, but is generally above about 2400° F.

The molten material is then fiberized by being run into upwardly-directed jets of steam or air which shred it into fibres. By the time the fibres land on the collecting means, they have solidified into their final size and shape.

*Specific examples*

The following examples serve to illustrate the process of the present invention and are not to be construed as limiting the scope of the invention:

*Example I*

The following materials in the proportions stated were charged to the cupola: Iron blast furnace slag (25.15%; lead furnace slag, 17.31%; glauconite-bound briquets, 56.54%; and coke in a ratio of 1 part per 7.7 parts of mineral wool-forming charge. The glauconite-bound briquets contained 20% of glauconite, 20% of silica sand, and 60% of mineral wool shot.

The charge was melted in the cupola at a temperature of about 2400° F., and the molten mass was tapped off into a small reverberating furnace. At the outlet of the furnace, the molten material was divided into eight individual streams each of which was led in front of a "nozzle" or "blow-cap" which was supplied with steam at 100 p. s. i. The impact of high pressure steam upon the stream of molten material atomized it into small droplets which were drawn out into the shape of a wool fiber. The wool was collected in the bottom of the blow chamber on a continuous conveyor. The wool was then treated to remove shot, and bagged. The wool was of black coloration, and possessed high moisture and temperature resistance and chemical stability. The fibres were strong and resilient and were low in free alkali.

*Example II*

A cupola charge containing the following: 36.9% of iron blast furnace slag; 28.9% of lead furnace slag, and 34.2% of glauconite-bound briquets and coke in a ratio of 1 part thereof per 8 parts of mineral wool-forming materials was treated as in Example I. In this example, the glauconite-bound briquets contained 28% of glauconite; 20% of silica sand, and 55% of mineral wool shot.

*Example III*

A cupola charge in which all the mineral wool-forming ingredients were in the form of glauconite-bound briquets was treated as in Example I. The briquets contained: 20% of glauconite; 26% of granulated lead furnace slag; 48% of crushed iron blast furnace slag; 6% of bar sand.

*Example IV*

A cupola charge in which all the mineral wool-forming ingredients were in the form of glauconite-bound briquets was treated as in Example I. The briquets contained: 25% of glauconite; 12.5% of mill scale; 27.5% of crushed limestone; and 35% of bar sand.

Considerable modification is possible in the selection of the various charge ingredients and their proportions, as well as in the manner of their addition to the cupola, without departing from the scope of the invention.

I claim:

1. In the manufacture of mineral wool, the steps of adding to the cupola a charge of mineral wool-forming ingredients comprising agglomerated bodies in which particles of mineral wool-forming material are bound in a matrix comprising glauconite having a particle size no greater than 100 microns in an amount between 3% and 70%, melting said charge, and fiberizing the molten charge.

2. The steps of claim 1 wherein the matrix of said agglomerated bodies comprises between 4% and 50% of glauconite having a particle size no greater than 100 microns.

3. The steps of claim 1 wherein the charge of mineral wool-forming material comprises: 30 to 50% of $SiO_2$; trace to 20% of $Al_2O_3$; trace to 35% of iron oxide; 10 to 45% of $CaO$; and trace to 25% of $MgO$.

4. The steps of claim 1 wherein substantially all of said charge of mineral wool-forming ingredients is present in the form of agglomerated bodies bound by said glauconite matrix.

5. In the manufacture of mineral wool, the steps of adding to the cupola a charge of mineral wool-forming ingredients comprising agglomerated bodies, said agglomerated bodies comprising 45% to 65% of mineral wool shot bound in a matrix comprising glauconite having a particle size no greater than 100 microns in an amount between 3% and 70%, melting said charge, and fiberizing the molten charge.

6. The steps of claim 5 wherein the matrix of said agglomerated bodies comprises between 4% and 50% of glauconite having a particle size of no greater than 100 microns.

7. In the manufacture of mineral wool, the steps of adding to the cupola a charge of mineral wool-forming ingredients comprising agglomerated bodies, said agglomerated bodies comprising, in intimate admixture, between 45% and 65% of mineral wool shot and between 15% and 25% of silica sand bound in a matrix of glauconite, said glauconite being present in an amount between 15% and 45%, between 45% and 100% of which is of a particle size no greater than 100 microns, melting said charge and fiberizing the molten charge.

LEONARD JOHN MINNICK.

REFERENCES CITED

The following references are of record in the file of this patent:

UNITED STATES PATENTS

| Number | Name | Date |
|---|---|---|
| 372,486 | Parrott | Nov. 1, 1887 |
| 2,051,279 | Thorndyke | Aug. 18, 1936 |
| 2,265,540 | Nichols | Dec. 9, 1941 |

FOREIGN PATENTS

| Number | Country | Date |
|---|---|---|
| 362,631 | Germany | 1922 |
| 125,908 | Switzerland | 1928 |
| 792,947 | France | 1935 |
| 215,397 | Switzerland | 1941 |

OTHER REFERENCES

J. R. Thoenen: Mineral Wool, page 19, Information Circular 6984R, June 1939, Bureau of Mines, U. S. Dept. of Interior.

J. R. Thoenen: Mineral Wool, pages 22 and 23, Information Circular 6984R, June 1939, Bureau of Mines, U. S. Dept. of Interior.

Certificate of Correction

Patent No. 2,576,312                                                  November 27, 1951

LEONARD JOHN MINNICK

It is hereby certified that error appears in the printed specification of the above numbered patent requiring correction as follows:

Column 4, line 13, for "2-94%" read *2.94%*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*